United States Patent

Breslin

[11] Patent Number: 6,142,502
[45] Date of Patent: *Nov. 7, 2000

[54] RECEIVER HITCH ANTI-RATTLE DEVICE

[75] Inventor: Patrick William Breslin, Wickenburg, Ariz.

[73] Assignee: U-Haul International, Inc., Phoenix, Ariz.

[*] Notice: This patent is subject to a terminal disclaimer.

[21] Appl. No.: 09/420,024

[22] Filed: Oct. 18, 1999

Related U.S. Application Data

[62] Division of application No. 08/958,739, Oct. 27, 1997, Pat. No. 6,010,144, which is a continuation of application No. 08/633,586, Apr. 17, 1996, abandoned, which is a continuation of application No. 08/470,663, Jun. 19, 1995, Pat. No. 5,593,172, which is a division of application No. 08/281,828, Jul. 28, 1994, abandoned.

[51] Int. Cl.[7] .................................................. B60D 1/00
[52] U.S. Cl. .................... 280/506; 280/491.5; 403/104
[58] Field of Search ................... 280/506, 491.5, 280/491.1, 495, 504, 491.2, 482; 224/521, 519, 518; 403/3, 104, 109, 362, 377, 379

[56] References Cited

U.S. PATENT DOCUMENTS

| 4,050,714 | 9/1977 | Epp | 280/495 |
|---|---|---|---|
| 4,072,257 | 2/1978 | Hall | 224/29 R |
| 4,576,501 | 3/1986 | McConnell | 403/59 |
| 4,744,690 | 5/1988 | Hsieh | 403/104 |
| 4,818,135 | 4/1989 | Desjardins | 403/104 |
| 5,184,840 | 2/1993 | Edwards | 280/507 |
| 5,449,100 | 9/1995 | Eckhart | 224/509 |
| 5,593,172 | 1/1997 | Breslin | 280/506 |

Primary Examiner—Brian L. Johnson
Assistant Examiner—Avraham H. Lerner
Attorney, Agent, or Firm—Jeffer, Mangels, Butler & Marmaro LLP

[57] ABSTRACT

A device for a receiver-type hitch used on vehicles for towing a load, wherein the device acts to prevent movement and resultant rattling between a receiver tube of the hitch and a ball mount shank. In operation, the receiver tube receives the ball mount shank. The device applies a force to the ball mount shank which presses the ball mount shank against the inside of the receiver tube and therein prevents movement.

6 Claims, 4 Drawing Sheets

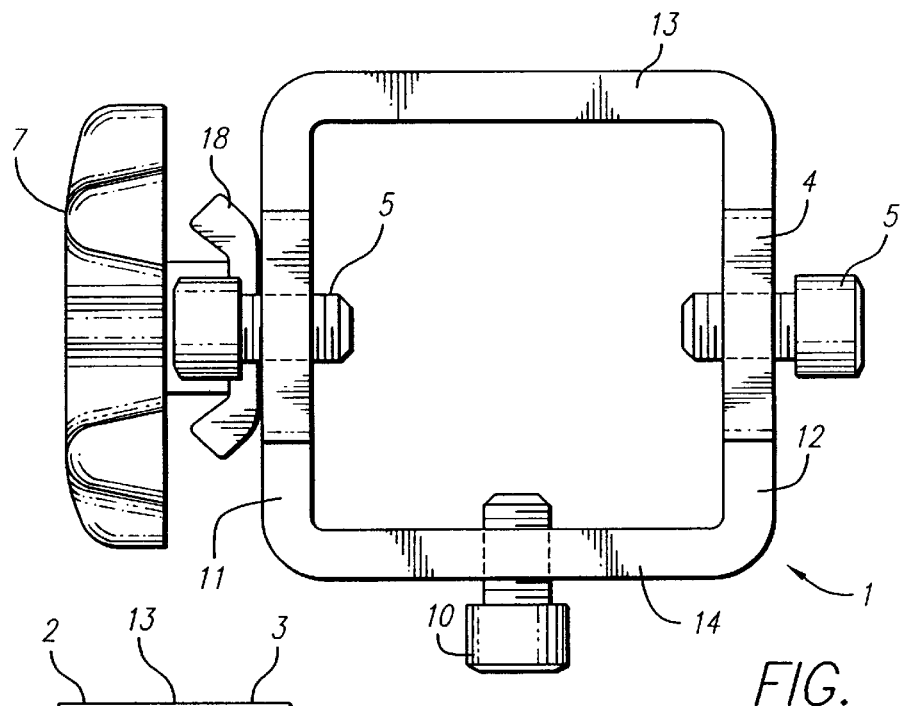
FIG. 1
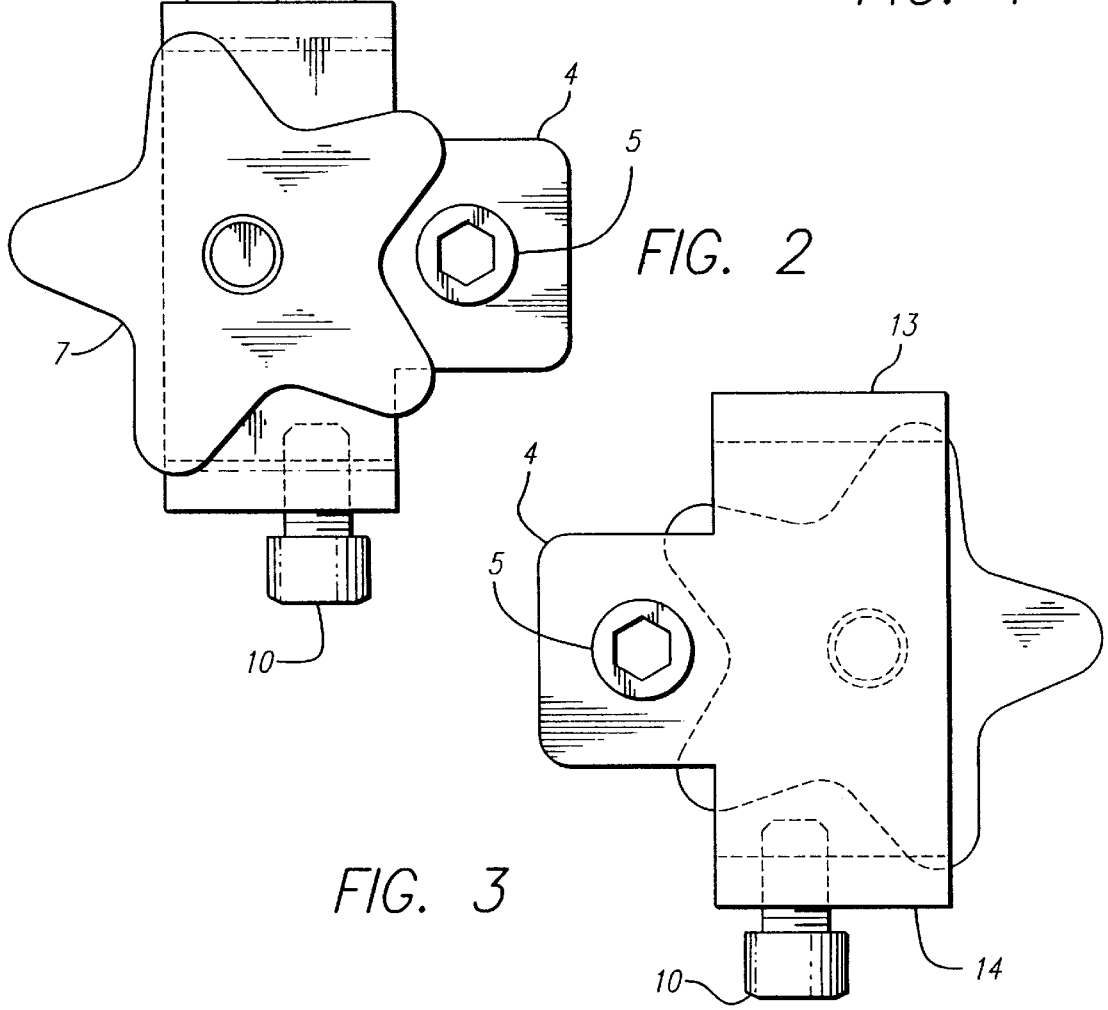
FIG. 2
FIG. 3

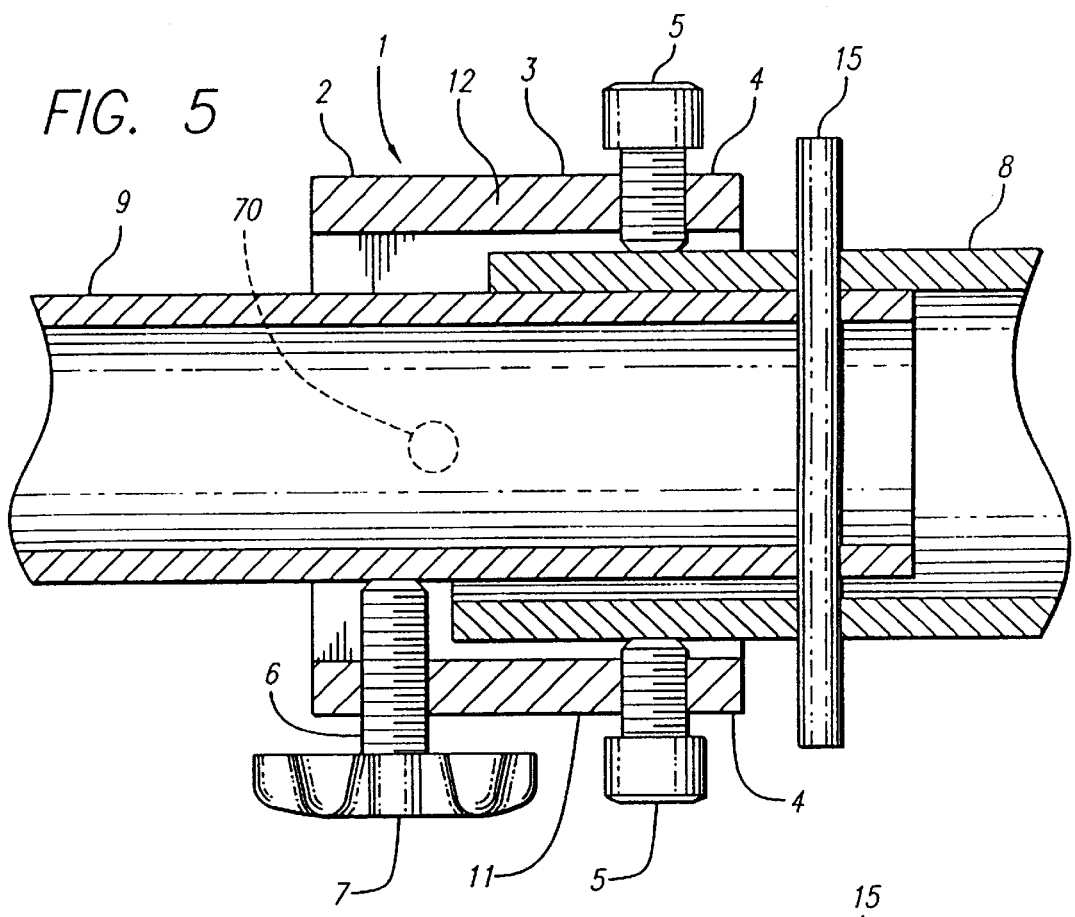
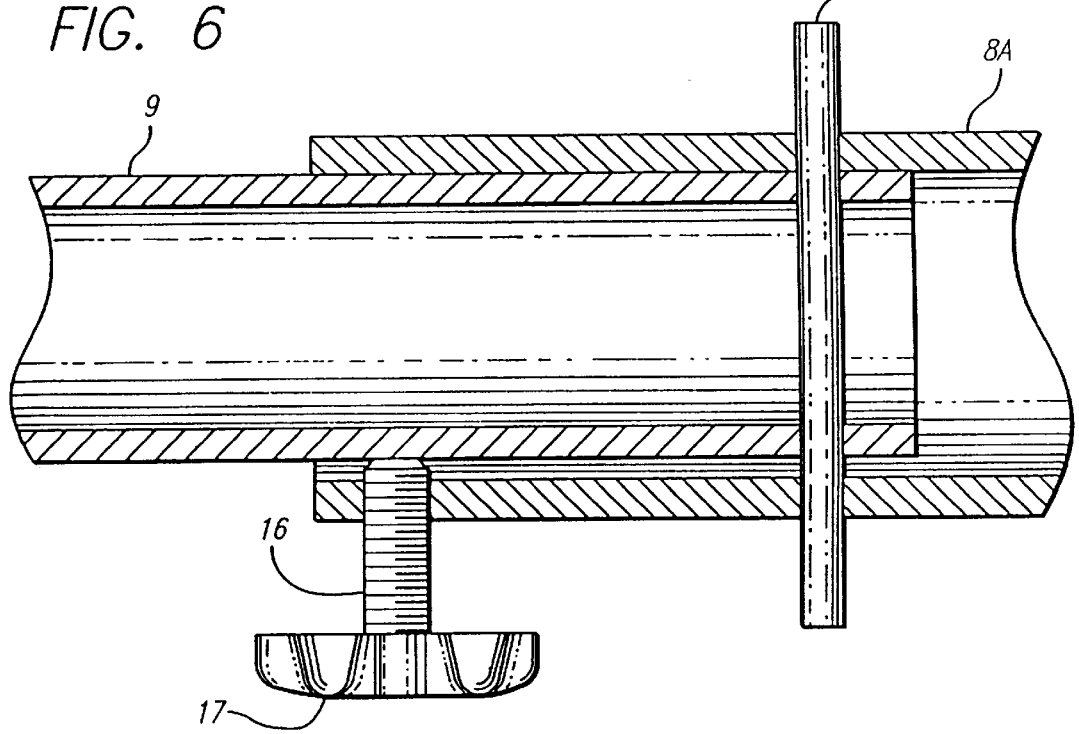

RECEIVER HITCH ANTI-RATTLE DEVICE

This is a division of application Ser. No. 08/958,739, filed on Oct. 27, 1997 now U.S. Pat. No. 6,010,144 which is a Continuation of Ser. No. 08/633,586, filed on Apr. 17, 1996 now abandoned which is a Continuation of Ser. No. 08/470,663, filed on Jun. 6, 1995 (which issued as U.S. Pat. No. 5,593,172 on Jan. 14, 1997) which is a Divisional of Ser. No. 08/281,828 filed on Jul. 28, 1994 now abandoned.

BACKGROUND OF THE INVENTION

The present invention relates generally to receiver hitch/ball mount combinations which are attachable to a towing vehicle for operable connection to an object to be towed. More specifically, the invention relates to a device which eliminates movement between the receiver hitch and the ball mount. As the movement between the receiver hitch and the ball mount is eliminated, so too will any noise which is created due to such movement.

Typically, the receiver hitch will comprise a receiver tube and the ball mount will comprise a mount shank. In order for the mount shank to be easily inserted into the receiver tube, the receiver tube will be slightly larger than the mount shank. Due to the slight difference in size the mount shank will have a tendency to move within the receiver tube and therein produce a rattling noise. While the movement and resultant noise may not have a detrimental effect on the mount combination, the rattling noise tends to be an annoyance.

SUMMARY OF THE INVENTION

It is an object of the invention to provide a device that will eliminate the movement between a receiver hitch and a ball mount.

It is a further object of the invention to provide a device that may be easily installed on the receiver hitch/ball mount combination.

According to a first preferred embodiment of the present invention, the device includes a collar arrangement which comprises means for attaching to a receiver tube and means for applying a pressure to a mount shank in order to press the mount shank into engagement with the receiver tube.

According to a second preferred embodiment of the resent invention, a receiver tube is provided which comprises means for applying a pressure to a mount shank in order to press the mount shank into engagement with the receiver tube.

BRIEF DESCRIPTION OF THE DRAWING

FIG. 1 is a rear elevational view of one embodiment of the present invention.

FIG. 2 is a left side elevational view of the embodiment of FIG. 1.

FIG. 3 is a right side elevational view of the embodiment of FIG. 1.

FIG. 5 is a plan sectional view of the embodiment of FIG. 1 engaged with a receiver tube and a ball mount shank.

FIG. 6 is a plan sectional view of an alternative embodiment of the present invention.

DESCRIPTION OF THE PREFERRED EMBODIMENTS

Figure 4:
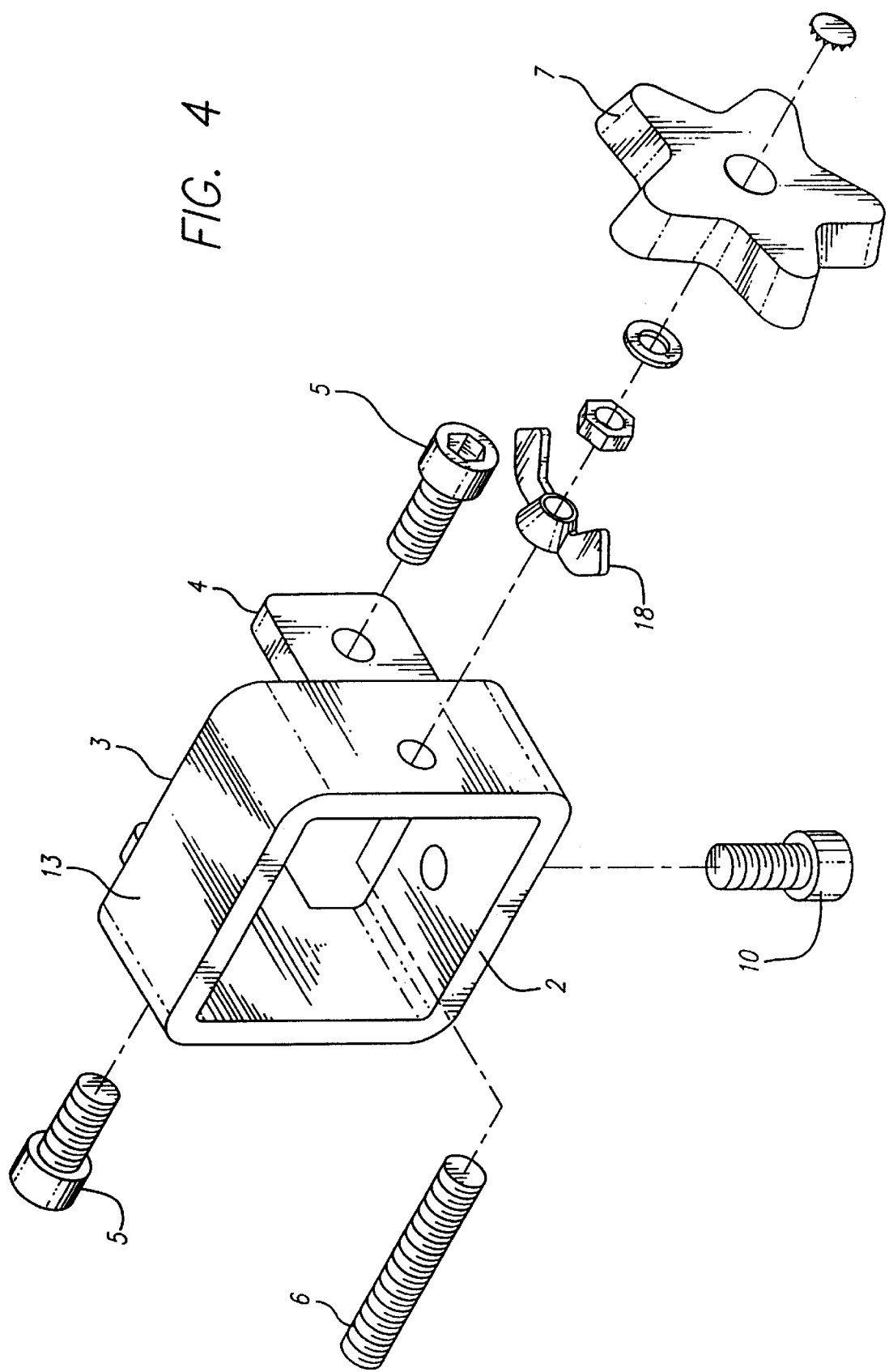
FIG. 4 is a front-left side Perspective exploded view of the embodiment of FIG. 1.
Figure 7:
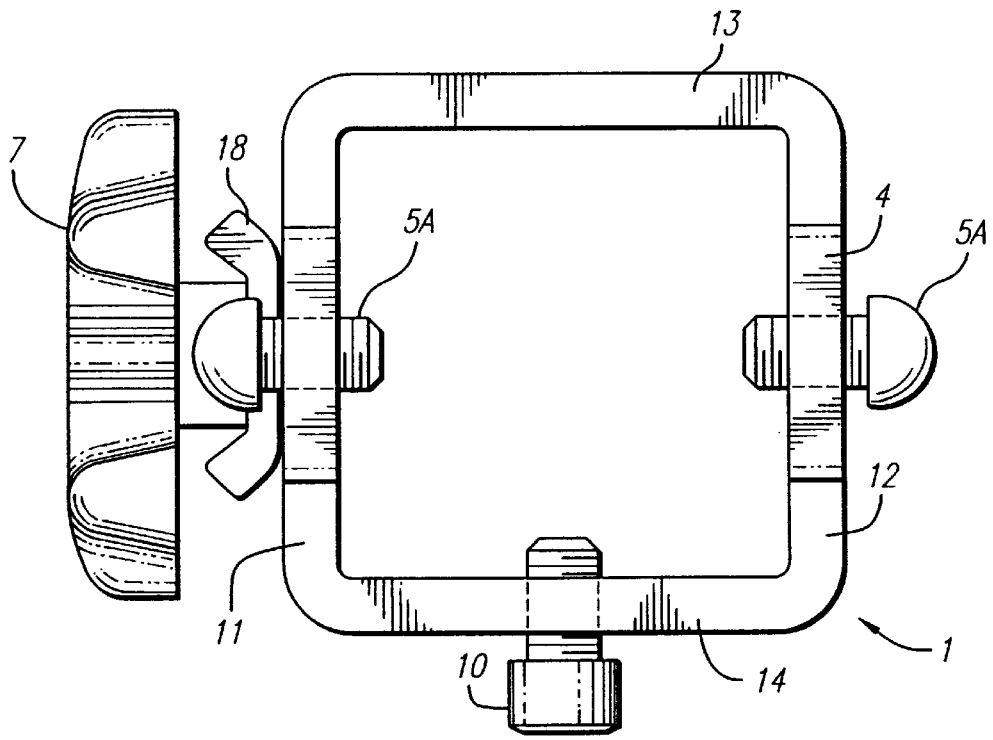
FIG. 7 is a rear elevational view of another embodiment of the invention employing bolts to mount the collar to the receiver tube.
Figure 8:
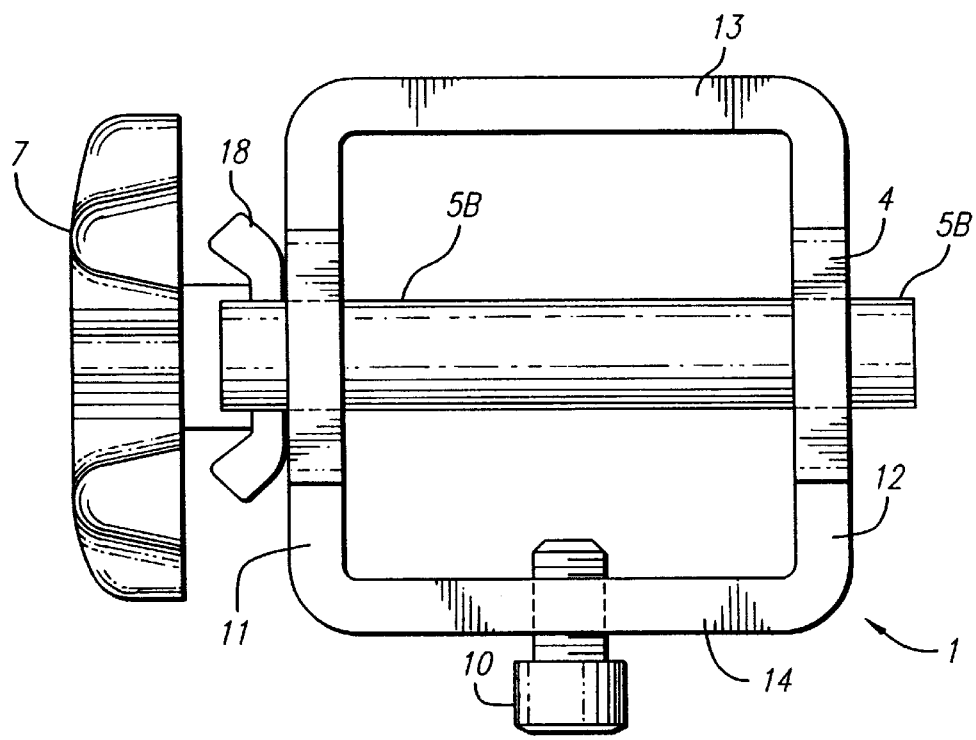
FIG. 8 is a rear elevational view of another embodiment of the invention employing a pin to mount the collar to the receiver tube.

The present invention will now be described with reference to FIGS. 1–5. A collar 1 of a preferred embodiment is illustrated in FIGS. 1–4. The collar 1 has a front end 2, a rear end 3, a pair of sidewalls 11 and 12, a top wall 13 and a bottom wall 14. Each sidewall 11 and 12 may have a rearwardly extending extension 4. Each extension 4 is formed with an aperture to receive a screw 5 for mounting the collar 1 to a receiver tube 8. It should be understood that other means equivalent to screw 5, such as a bolt or a pin, may be used to mount the collar 1 to the receiver tube 8. The bottom wall 14 also has an aperture near the rear end 3 for receiving a screw 10 for mounting the collar 1 to the receiver tube 8. Again, it should be noted that other mounting means equivalent to screw 10 may be employed. Sidewall 11 further has an aperture for receiving screw 6. Screw 6 engages a mount shank 9 as illustrated in FIG. 5. Screw 6 further may be operably connected to a knob 7 on an end opposite the end which engages mount shank 9. A wing nut 18 may be employed to aid screw 6 in engaging mount shank 9.

FIG. 5 illustrates a collar of a preferred embodiment of the present invention engaged with receiver tube 8 and mount shank 9. In operation, the rear end 3 of collar 1 is placed around a terminal end of receiver tube 8. Collar 1 is affixed to the terminal end of receiver tube 8 by extension screws 5 and bottom wall screw 10. Once collar 1 is attached to receiver tube 8, mount shank 9 is inserted into receiver tube 9. Mount shank 9 is fixed into a longitudinal position relative to receiver tube 8 by conventional fixing means such as a pin 15 which extends through openings in tube 8 and shank 9. Once the mount shank 9 is fixed by pin 15, screw 6 is engaged by turning knob 7 to apply a pressure against mount shank 9. As pressure is applied by screw 6 against mount shank 9, mount shank 9 is pressed into engagement with receiver tube 8. Once screw 6 is fully tightened so as to engage mount shank 9 with receiver tube 8 all movement between mount shank 9 and receiver tube 8 will be eliminated. This in turn will eliminate any rattling noise due to movement between mount shank 9 and receiver tube 8.

A second preferred embodiment is illustrated in FIG. 6. This embodiment provides a simplified anti-rattling arrangement. As illustrated in FIG. 6, mount shank 9 is inserted into receiver tube 3. The mount shank 9 is fixed to receiver tube 8 along a longitudinal axis of the receiver tube by pin 15. Receiver tube 8 has a threaded bore for receiving a screw 16. Screw 16 is tightened by a knob 17 fixed to screw 16. As screw 16 is tightened to engage mount shank 9, mount shank 9 is pressed into engagement with receiver tube 8. Once screw 16 is fully tightened and mount shank 9 is pressed against receiver tube 8 all movement between mount shank 9 and receiver tube 8 will be eliminated.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. A receiver hitch assembly, comprising:
   a receiver tube;
   a mount shank in telescoping relationship with the receiver tube, the mount shank being inside the receiver tube;
   a collar sub-assembly including a collar having an aperture for receiving the receiver tube and mount shank when they are in a telescoped relationship, wherein when the receiver tube and mount shank are in telescoped relationship within the collar aperture, the receiver tube is directly engaged by the collar of the collar sub-assembly, wherein the collar includes first and second integral tabs each having an aperture therein, and
   a pin engaging the mount shank and receiver tube.

2. The receiver hitch assembly of claim 1, comprising a connector passing through the aperture of the first tab and being in contact with the receiver tube.

3. The receiver hitch assembly of claim 1, comprising a connector passing through the aperture of the second tab and being in contact with the receiver tube.

4. The receiver hitch assembly of claim 1, wherein the pin does not pass through the collar.

5. The receiver hitch assembly of claim 2, wherein the pin does not pass through the collar.

6. The receiver hitch assembly of claim 3, wherein the pin does not pass through the collar.

* * * * *